(12) United States Patent
Yang et al.

(10) Patent No.: US 8,058,981 B2
(45) Date of Patent: Nov. 15, 2011

(54) TIRE PRESSURE MONITORING DEVICE WITH LED WARNING LIGHT TURNED ON BY MECHANICAL PRESSURE SWITCH

(75) Inventors: James Y. Yang, Nanchang (CN); Yunlong Min, Nanchang (CN); Jianyun Yang, Nanchang (CN); Qiang Shen, Santa Clara, CA (US); Huigang Tu, Nanchang (CN)

(73) Assignee: Kysonix, Inc., Nanchang (CN)

( * ) Notice: Subject to any disclaimer, the term of this patent is extended or adjusted under 35 U.S.C. 154(b) by 419 days.

(21) Appl. No.: 11/985,019

(22) Filed: Nov. 13, 2007

(65) Prior Publication Data
US 2009/0121855 A1 May 14, 2009

(51) Int. Cl.
*B60C 23/00* (2006.01)

(52) U.S. Cl. ..... 340/442; 73/146.4; 73/146.3; 73/146.5; 73/146.8; 116/34 R

(58) Field of Classification Search .................. 340/442, 340/445, 447; 73/146–146.8; 116/34 R, 116/266, 276
See application file for complete search history.

(56) References Cited

U.S. PATENT DOCUMENTS

| | | | | |
|---|---|---|---|---|
| 5,025,244 A * | 6/1991 | Huang | ........................... | 340/442 |
| 5,557,256 A * | 9/1996 | Achterholt | ..................... | 340/442 |
| 5,986,576 A * | 11/1999 | Armstrong | .................... | 340/908 |
| 6,006,600 A * | 12/1999 | Cheng | ........................... | 73/146.5 |
| 6,055,854 A * | 5/2000 | Chen | ............................ | 73/146.8 |
| 6,629,454 B2 * | 10/2003 | Lundqvist | ..................... | 73/146.8 |
| 7,421,889 B2 * | 9/2008 | Lin | ................................. | 73/146 |
| 2004/0112129 A1* | 6/2004 | Lundqvist et al. | .............. | 73/146 |

* cited by examiner

*Primary Examiner* — Brent Swarthout
(74) *Attorney, Agent, or Firm* — Bo-In Lin

(57) ABSTRACT

A tire pressure-monitoring device (TPMD) directly mounted onto an air-pumping inlet-stem on a tire. The TPMD includes a light emitter connected to a battery through an electrical connecting loop wherein the electrical connecting loop comprising a plurality of electrical conductive structural components and at least two of the structural components are physically separated in a normal tire pressure condition and connected in a low pressure tire pressure condition for providing power to the light emitter for emitting a low tire pressure warning light.

11 Claims, 2 Drawing Sheets

TIRE PRESSURE MONITORING DEVICE WITH LED WARNING LIGHT TURNED ON BY MECHANICAL PRESSURE SWITCH

BACKGROUND OF THE INVENTION

1. Field of the Invention

The present invention is generally related to device configuration and method of a tire pressure-sensing (TPS) and low-pressure warning device. More particularly, this invention is related to device configuration and mechanical pressure switch design for implementing a compact tire pressure monitoring to mechanically turning on a light emitting diode (LED) for providing a low pressure warning light when the tire pressure is lower than a threshold pressure.

2. Description of the Related Art

Conventional technologies and devices for measuring the changes of tire pressure are still faced with the difficulties that the tire pressure measurements and warning often require continuously supply of a battery power. A battery has a limited lifetime and the power consumed for continuously monitoring and providing low pressure-warning signals may not be reliable if the capacity of battery is depleted.

Generally there are two types of tire pressure monitoring systems (TPMS). The first type of TPMS is an indirect tire pressure monitoring system that monitoring the changes of tire pressures by monitoring the rotational speed differences as that detected and transmitted through the ABS speed transmitter. This type of TPMS has a limitation that the tire pressure monitoring operation would become ineffective when there are simultaneous tire-pressure changes occur in more than one tires. Also, the TPMS become unreliable when a vehicle is traveling at a speed more than one hundred kilometers per hour. A second type of tire pressure-monitor system is a direct tire pressure monitoring system implemented with tire pressure measurement devices directly mounted on the tire. The tire pressures are measured and monitored continuously. Once the tire pressure in a tire is lower or higher than a threshold value, an alarm signal is generated. The direct type of TPMS has definite advantages of higher accuracy and reliability over the indirect type of TPMS. However, a discussed above, the direct TPMS devices still have limit capability to effectively transmit pressure monitoring signals and furthermore, there still lacks an antitheft device mechanism with the tire pressure monitoring devices directly mounted onto the tires. Practical application of the direct TPMS devices would still have the concerns that such devices may often be stolen and lost due to such limitations.

In order to resolve the power consumption limitation when a battery is implemented in the tire pressure-monitoring device, it generally requires the use of a programmable chip with intelligence built into a controller. Such implementation often leads to a higher production cost of the power-monitoring device. The application of the tire pressure monitoring device and systems become uneconomical due to the higher cost of implementation. The higher price of tire-pressure monitoring and control would often limit the practical marketability and usefulness of such devices and systems.

Therefore, there is still need to design and manufacture a tire pressure monitor device and system with further simplified and convenient to implement devices that would enable those of ordinary skill in the art to overcome such difficulties and limitations.

SUMMARY OF THE INVENTION

Accordingly, it is an aspect of the present invention to provide a tire-pressure monitoring device (TPMD) directly mounted onto a tire. The TPMD is designed that can be automatically activated only when a tire pressure is lower than a threshold voltage to supply power to a light emitting diode (LED). Immediately upon detecting a low pressure, a low pressure warning light is turned on to provide a warning signal to a driver of the low-pressure condition. By implementing such TPMD, the battery power of the TPMS of a sensing and warning device directly mounted on the tires can be preserved for long-term operation.

It is another aspect of this invention that the present invention provides a tire-pressure monitoring device (TPMD) that has an improved accuracy in detecting a low-pressure condition to turn on a waning light by turning on a light emitting diode (LED) to project a low pressure warning signal. The low-pressure condition can be accurately detected and timely corrected.

Briefly, this invention discloses a tire pressure-monitoring device (TPMD) directly mounted onto an air-pumping inlet-stem on a tire. The TPMD further includes a light emitter connected to a battery through an electrical connecting loop wherein the electrical connecting loop comprising a plurality of electrical conductive structural components and at least two of the structural components are physically separated in a normal tire pressure condition and connected in a low pressure tire pressure condition for providing power to the light emitter for emitting a low tire pressure warning light. In an exemplary embodiment, the TPMD further includes a tire-pressure engaging-membrane engaged to an air pressure through the air-pumping inlet-stem pushed from an air filled in the tire and the tire-pressure engaging-membrane further engaging to at least one of the electrical conductive components for applying a force thereon to break the electrical connecting loop in a normal tire pressure condition and applying a reduced force to one of the conductive structural components in a low tire pressure condition for closing the electrical connecting loop for providing electrical power from the battery to the light emitter to transmit a low pressure warning light. In another exemplary embodiment, the TPMD further includes a tire-pressure adjustment spring for adjusting a pressure applied by one of the conductive structural components to the pressure engaging-membrane for adjusting a pressure when the conductive structural component pushing back the tire pressure engaging membrane to close the electrical connecting loop for the light emitter to transmit the low pressure warning signal. In another exemplary embodiment, the TPMD further includes a transparent cover for covering and protecting the TPMD and for transmitting the low-pressure warning signal through the transparent cover.

Specifically, this invention discloses a method for mounting a tire pressure-monitoring device (TPMD) directly onto an air-pumping inlet-stem on a tire for providing a low-pressure warning light. The method includes a step of connecting a light emitter to a battery through an electrical connecting loop comprising a plurality of electrical conductive structural components of the TMPD and physically separating at least two of the structural components in a normal tire pressure condition and connecting the two conductive structural components in a low pressure tire pressure condition for providing power to the light emitter for emitting the low tire pressure warning light. In an exemplary embodiment, the method further includes a step of employing a tire-pressure engaging-membrane for engaging to an air pressure through the air-pumping inlet-stem pushed from an air filled in the tire and engaging the tire-pressure engaging-membrane to at least one of the electrical conductive components for applying a force thereon to break the electrical connecting loop in a normal tire pressure condition and applying a reduced force to one of the conductive structural components in a low tire pressure condition for closing the electrical connecting loop for providing electrical power from the battery to the light emitter to transmit the low pressure warning light. In another exemplary embodiment, the method further includes a step of employing a tire-pressure adjustment spring for adjusting a pressure applied by one of the conductive structural components to the pressure engaging-membrane for adjusting a pressure when the conductive structural component pushing back the tire pressure engaging membrane to close the electrical connecting loop for the light emitter to transmit the low pressure warning signal. In another exemplary embodiment, the method further includes a step of covering and protecting the TMPD by a transparent cover and transmitting the low-pressure warning signal through the transparent cover These and other objects, features and advantages of the present invention will no doubt become apparent to those skilled in the art after reading the following detailed description of the preferred embodiments that are illustrated in the several accompanying drawings.

BRIEF DESCRIPTIONS OF THE DRAWINGS

The present invention can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENTS

Figure 1:
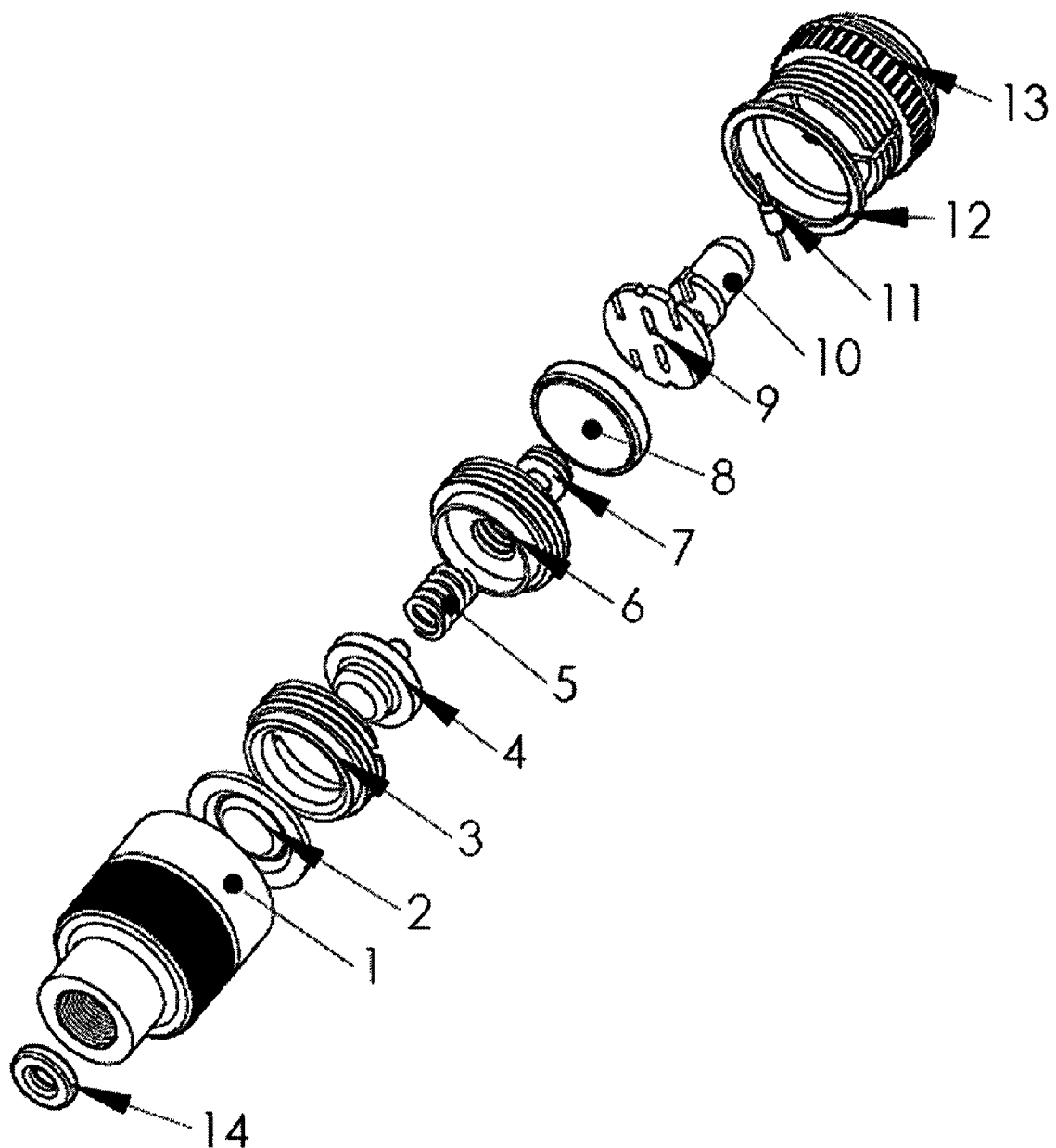
FIG. 1 is a function assembly perspective diagram for illustrating the structure and function of a tire-pressure monitoring device of this invention.

This invention discloses a tire-pressure monitoring device directly mounting to a tire and continuously monitors the pressure in each tire. When a tire pressure is lower than a threshold low pressure, a light-emitting device as part of the tire-pressure monitoring device is activated. A low tire-pressure warning light is turned on to provide a warning of the low tire-pressure condition. FIG. 1 shows the structural configuration of the tire-pressure monitoring device according to an exemplary embodiment of the present invention. The tire-pressure monitoring device (TPMD) as disclosed has a simplified structure, easy to convenient to manufacture and assemble, can be conveniently mounted on a tire, easy to operate. Furthermore, the TPMD can be manufactured and operated at a very economical cost with effective monitoring process to assure proper tire pressure is maintained in each tire.

In an exemplary embodiment of the invention as shown in FIG. 1, the tire pressure-monitoring device includes a base assembly and an upper-cover assembly that can be screwed onto the base assembly as an assembled tire-pressure monitoring device.

The base assembly includes a cylinder housing 1 for receiving and containing a tire-pressure membrane 2 securely pressed and fixed in the cylinder housing 1 by a press-down ring 3. A receiving cup 4 extends through the central hole of the press-down ring to press and engage the tire-pressure membrane 1 when the tire pressure is lower than a threshold tire pressure. A pressure adjustment spring 5 extends to the receiving cup 4 that has a rod extends into the central hole of the pressure-adjustment spring 5 to fix the pressure-adjustment spring 5 disposed substantially perpendicularly engaged to the receiving cup 4. The upper end of the pressure-adjustment spring 5 extends through an insulation ring 6 to engage to a pressure adjustment screw 7. The pressure-adjustment screw 7 is provided to screw onto the insulation ring 6 to adjust the length of the tire-pressure adjustment spring 5 during a normal operation pressure.

The upper cover assembly includes a transparent cover 13 for containing a printed circuit board 9 disposed on top of a battery 8 and supporting a light emitting diode 10 for emitting light when the battery 8 is in physical contact and then activates the circuit disposed on the printed circuit board 9. A current limiting resistor 11 is formed on the PCB 9 and is connected to the LED 10 and all these component are tightly sealed and housed in the transparent upper cover 13 by the use of a seal ring 12 to tightly engage to the base assembly by screwing onto the base assembly. One terminal of the LED 10 is connected to the current limiting resistor 11 and another terminal is engaged to a spring-plate (not specifically shown). The Spring The cylinder housing 1 of the base unit includes inner screws to match the outer screws of the press-down ring 3 and the outer screws of the insulation ring 6. When the press-down ring 3 and the insulation ring 6 are screwed onto the cylinder housing 1, the receiving cup 4 is engaged to the pressure adjustment spring 5, and the receiving cup 4 can be moved up or down inside the cylinder housing. The receiving cup 4 can be pushed up by the tire-pressure membrane 1 or pushed down by the pressure-adjustment spring 5. Further explanations of the functions and operation processes of the tire-pressure monitoring device are provided below.

The tire-pressure monitor device with a low-pressure warning signal by using a LED light emitting diode includes a base assembly and an upper cover assembly screwed together. The base assembly includes a cylinder housing 1 that has screws to screw onto a tire-pressure stem of a tire. The tire-pressure membrane 2 is tight pressed down by the press down ring 3 and is therefore engaged to the opening of the tire-pressure stem. The tire-pressure membrane 2 is therefore pushed up with a higher tire pressure and pressed down by the tire-pressure adjustment spring 5 when the tire pressure is low. The press down ring 3 has outer screws to screw onto the inner screws of the cylinder housing 1. The insulation ring 6 surrounds the press-down ring 3 and the insulation ring 6 has outer screws to screw onto the inner screws of the cylinder housing 1. The central space of the insulation ring 6 has a ring-shaped platform with the receiving cup 4 extends therethrough with a lower end engaged to the tire-pressure membrane 2. The receiving cup 4 further has a rod extended out to adapt to and fix the angular orientation of the tire-pressure adjustment spring 5 to position substantially perpendicular to the receiving cup 4. The upper end of the tire-pressure adjustment spring 4 is engaged to a spring adjustment screw 7 fitting inside the ring-shaped platform inside the insulation ring 6. The configuration as described thus allows the receiving cup 4 to move up or down inside the surrounding structures. Furthermore, the tire-pressure adjustment screw 7 is able to adjust the engagement of the receiving cup 4 to the tire pressure membrane 2 by tightening or loosing the adjustment screw 7 to the insulation ring 6.

The upper cover assembly also has a central hollow space with screws to tightly screw onto the inner screws of the cylinder housing 1 of the base assembly. The central hollow space of the upper cover assembly also contains the printed circuit board 9 with a light emitting diode (LED) 10 and a current limiting resistor 11 connected in series. The other end of the LED is connected to a conductive spring plate to engage to the battery 8. The other end of the current limiting resistor 11 is also configured as a spring plate to engage to the inside surface of the transparent cover 13. The transparent cover 13 has outer screws to screw onto the inner screws of the cylinder housing 1 and tightly sealed through the seal ring 12.

In the process of assembling the tire-pressure monitoring device, the battery 8 is first placed inside the transparent cover 13 and screw onto the base assembly. The insulation ring 6 and the PCB are made with insulation materials and the other components are made with conductive materials. The O-ring 14 is applied to tightly seal the tire-pressure monitoring device onto the tire-pressure stem of the tire.

Figure 2:
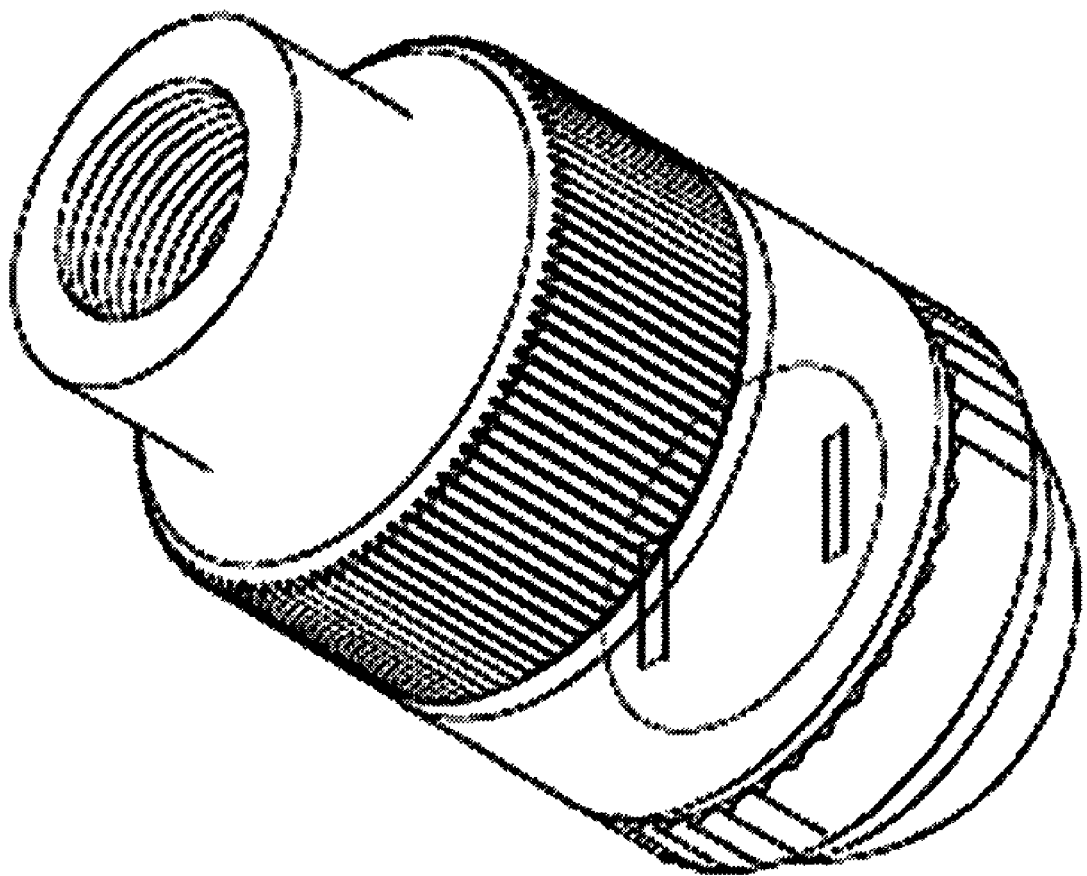
FIG. 2 shows a perspective view of the tire-pressure monitor device when assembled and housed and protected in a base-housing cylinder assembled to an upper cover assembly.

The assembling processes starts with a step of placing the tire-pressure membrane 2 into the cylinder housing 1 and then tightly pressing down by screwing the press down ring 3 onto the cylinder housing 1 such that the low part is leak proof. The receiving cup 4 is placed inside the press down ring 3 and the tire-pressure adjustment spring 5 is placed along the spring-fixing rod. Then the insulation ring is screwed onto the cylinder housing 1 thus fixes the receiving cup securely inside the cylinder housing 1. The tire spring adjustment screw 7 is then screwed onto the insulation ring to adjust the length of the tire-pressure of the adjustment spring 5. In assembling the upper cover assembly, the LED 10 and the current limiting resistor 11 are first placed and fixed to the PCT 9. The battery is placed inside the transparent cover 13 and then screwed onto the cylinder housing 1 to complete the assembling processes of the entire device as that shown in FIG. 2.

The positive electrode of the battery 8 is in contact with the spring length adjustment screw 7. The spring-length adjustment screw 7 is in contact with spring 5 and electrically connected to the receiving cup 4. The lower end of the receiving cup is in physical contact with press down ring 3 and the screws of the press down ring 3 are in physical contact with the screws of the cylinder housing. The screws of the cylinder housing 1 is near the positive electrode of the LED 10 and the negative electrode of the LED 10 is in connection with the negative electrode of the battery 8 through the spring plate that engages the current limiting resistor 11.

In normal operation pressure, the tire pressure pushes up the tire-pressure membrane 2 and the tire pressure membrane further pushes up the receiving cup 4. The connection between the receiving cup 4 and the cylinder housing 1 is broken and the power supply to the LED 10 is turned off. As the tire pressure falls below a threshold pressure, the tire-pressure adjustment spring 5 press down the receiving cup 4 to come into contact with the cylinder housing 1. The LED is now connected through the receiving cup 4 and the cylinder housing 1 to the battery. The current starts to flow through a closed current loop including the LED 10 and that causes the LED 10 to turn on. A low-pressure warning signal is there projected from the LED 10 through the transparent cover 13 to provide a warning signal of the low tire pressure condition.

According to above descriptions and drawings, this invention discloses a tire pressure-monitoring device (TPMD) directly mounted onto an air-pumping inlet-stem on a tire. The TPMD further includes a tire-pressure engaging-membrane engaged to an air pressure through the air-pumping inlet-stem pushed from an air filled in the tire. The pressure membrane pushes up a receiving cup to break an electrical connection loop in a normal tire pressure for turning off an electric power to a light emitting diode (LED) and a pressure-adjustment spring engaged to the receiving cup pushing down the pressure membrane for closing the electrical connection loop in a low tire pressure condition to turn on the LED to emit a low pressure warning light. In an exemplary embodiment, the TPMD further includes a battery for connecting and providing electric power through the electrical connection loop to the LED for emitting the low pressure warning light. In another exemplary embodiment, the TPMD further includes a transparent top cover for covering and protecting the LED and for transmitting the low-pressure warning light therethrough. In another exemplary embodiment, the TPMD further includes a base cylinder housing having inner screws for screwing onto the tire-pressure inlet-stem and the base cylinder housing constituting a part of the electrical connection loop with the receiving cup encompassed therein. In another exemplary embodiment, the TPMD further includes a spring adjust screw mounted on an insulation ring and engaged to the pressure-adjustment spring for adjusting a push-down pressure against the receiving cup. In another exemplary embodiment, the TPMD further includes a -down ring for engaging to the pressure membrane and screwing onto inner screws of a base cylinder housing for pressing and maintaining the pressure membrane in a fixed position inside the base cylinder housing. In another exemplary embodiment, the insulation ring further includes outer screws for screwing on inner screws of maintaining the receiving cup inside the base cylinder housing having a fixed range of up-down movement freedom depending on a pressure changes of the tire pressure. In another exemplary embodiment, the TPMD further includes a printed circuit board for supporting circuits thereon for connecting to a battery and a current limiting resistor to function as a part of the electrical connection loop. In another exemplary embodiment, the TPMD further includes a top cover having a hollow space for containing the battery, the printed circuit board and the LED in the hollow space and the top cover further having outer screws for screwing onto inner screws of a base cylinder housing for assembling and containing the TPMD inside an integrated container housing formed by the top cover and the base cylinder housing. In another exemplary embodiment, the TPMD further includes an O-ring for sealing an interface between the top cover when screwing onto the base cylinder housing. In another exemplary embodiment, the top cover further includes a transparent cover for transmitting a low pressure warning light when the LED is turned on in a low tire pressure tire condition.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A tire pressure-monitoring device (TPMD) having a base cylindrical housing for directly screwing onto an air-pumping inlet-stem on a tire comprising:
    a tire-pressure engaging-member formed with a central membrane attached onto a base attachment ring wherein said central membrane is formed to directly engage to an air pressure pushing up through said air-pumping inlet-stem from an air filled in said tire wherein said tire-pressure engaging-member is formed as a replaceable single piece to separately place into the base cylindrical housing;
    an upper cover assembly comprising a receiving cup having a sticking out extension configured to engage the central membrane wherein said receiving cup is engaged to a push down spring surrounded by a press-down ring screwed onto an insulation ring of the upper cover assembly; and said upper cover assembly is formed as a separate piece to screw onto the base cylindrical housing for engaging and pushing down the central membrane onto the air-pumping inlet stem for engaging and detecting a tire pressure of the air filled in said tire.

2. The TPMD of claim 1 wherein:

said upper cover assembly includes a printed circuit board (PCB) supports a light emitting diode (LED) on a top surface wherein said LED is electrically connected to a battery through electrodes disposed on a bottom surface of said PCB directly contacting at least a battery electrode of a battery disposed below the PCB and wherein said PCB further includes an external current limiting resistor electrically connected to said LED as part of an electrical current loop for limiting a current to the LED; and said pressure membrane pushes up the receiving cup to break said electrical current loop to said LED in a normal tire pressure for turning off said LED and the push down spring engaged to said receiving cup pushing down said pressure membrane for closing said electrical connection loop in a low tire pressure condition to turn on said LED to emit a low pressure warning light.

3. The TPMD of claim 2 wherein:

the battery includes a positive electrode to directly contact the electrodes disposed on the bottom surface of the PCB for connecting and providing electric power to said LED; and said upper cover assembly having a transparent top cover for covering and protecting said LED and said PCB powered by said battery for transmitting said low pressure warning light therethrough.

4. The TPMD of claim 1 wherein:

said base cylinder housing having inner screws for screwing onto said tire-pressure inlet-stem and said base cylinder housing constituting a part of said electrical current loop.

5. The TPMD of claim 4 further comprising:

a spring adjust screw mounted on an insulation ring mounted inside said upper cover assembly and engaged to said push down spring for adjusting a push-down pressure pressing against said receiving cup.

6. The TPMD of claim 1 wherein:

said press-down ring mounting on and engaging to said base-attachment ring surrounding said central membrane and screwing onto inner screws of a said base cylinder housing for attaching said upper cover assembly as a separate piece to said base cylinder housing.

7. The TPMD of claim 5 wherein:

said insulation ring further includes outer screws for screwing onto inner screws of said receiving cup inside said upper cover assembly having a fixed range of up-down movement freedom depending on a pressure changes of said tire pressure.

8. The TPMD of claim 2 wherein:

said LED further comprises a conductive spring plate to engage to the battery.

9. The TPMD of claim 8 wherein:

said upper cover assembly comprises a top cover having a cylindrical hollow space for containing said battery, said printed circuit board and said LED in said cylindrical hollow space and said top cover further having outer screws for screwing onto inner screws of a base cylinder housing for assembling and containing said TPMD inside an integrated container housing formed by said top cover and said base cylinder housing.

10. The TPMD of claim 9 wherein:

said upper cover assembly comprises an O-ring for sealing an interface surface between edges of said top cover when screwing onto said base cylinder housing.

11. The TPMD of claim 9 further wherein:

said top cover further includes a transparent cover for transmitting a low pressure warning light as a visible light through the transparent cover when said LED is turned on in a low tire pressure tire condition.

* * * * *